March 22, 1966     C. Z. MONROE, ETAL     3,241,291
MACHINE FOR FORMING, CLOSING AND SEALING PLASTIC
COATED PAPERBOARD CONTAINERS
Original Filed Nov. 7, 1960     8 Sheets-Sheet 2
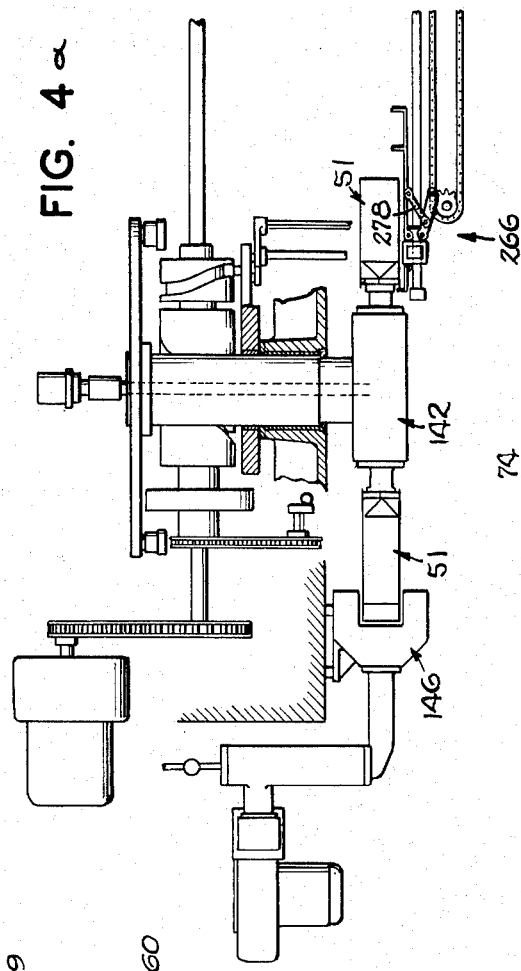
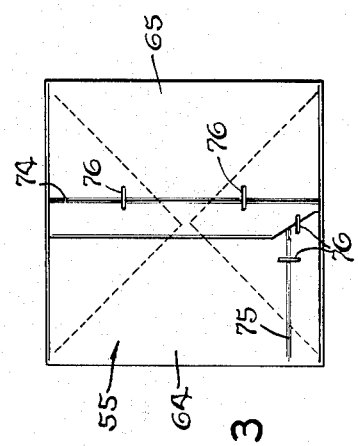
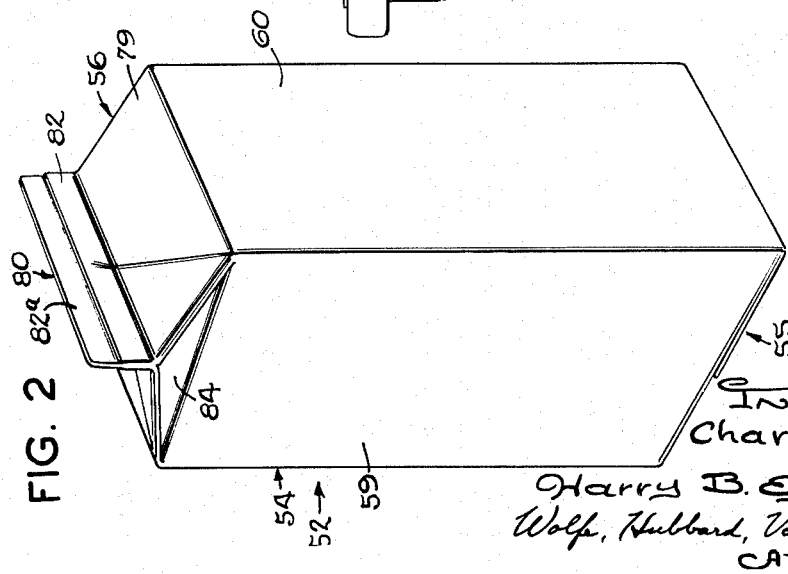

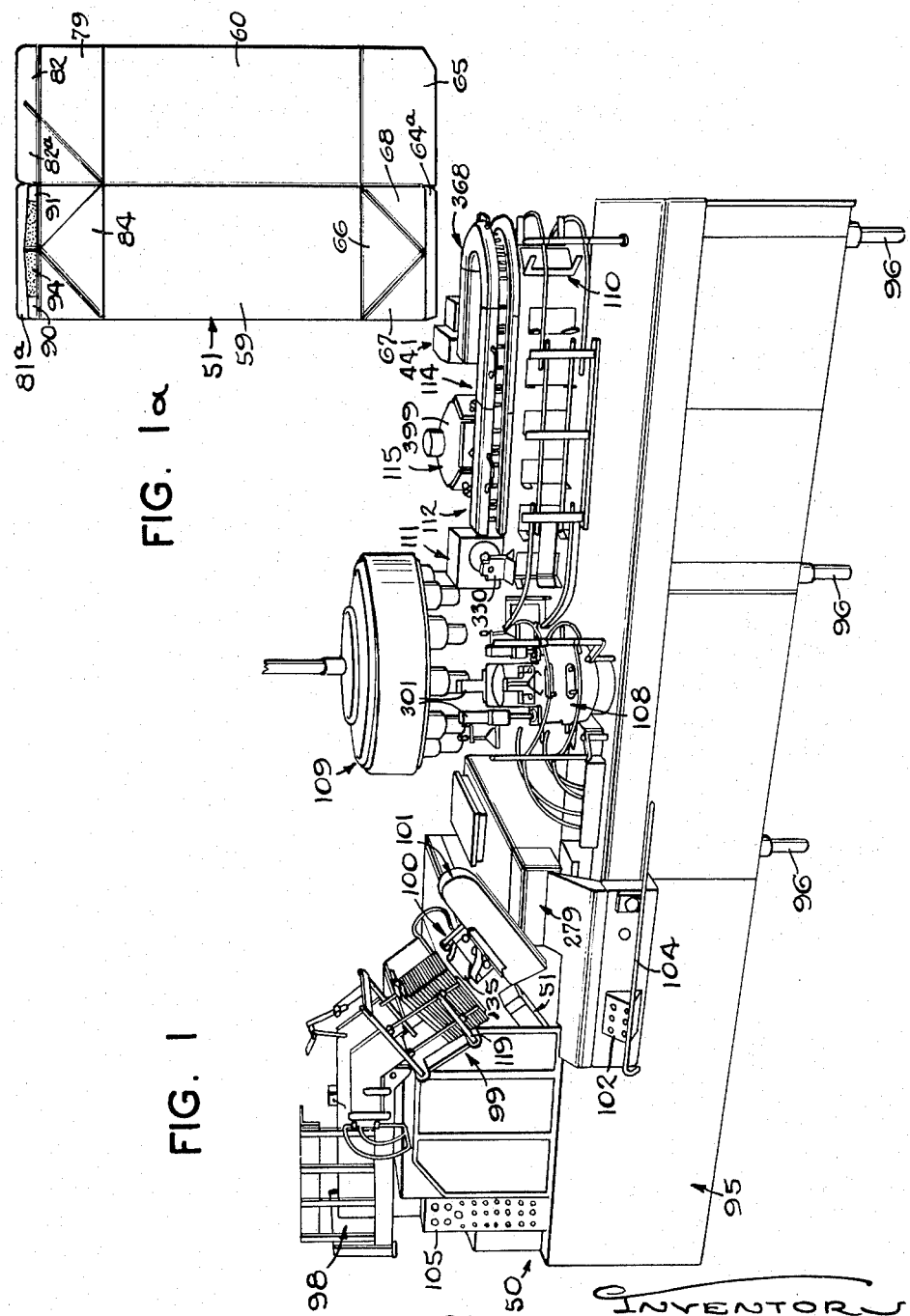

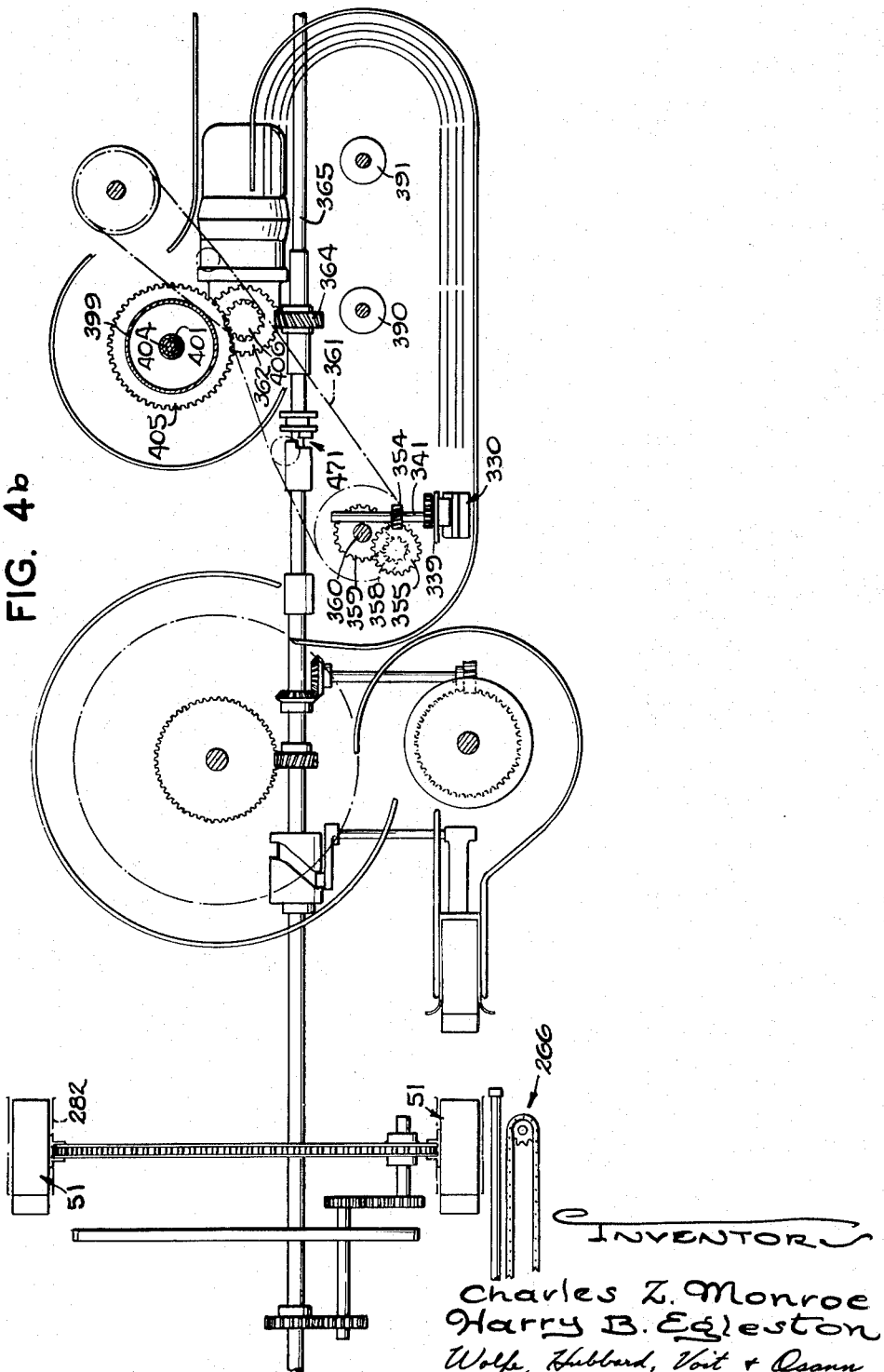

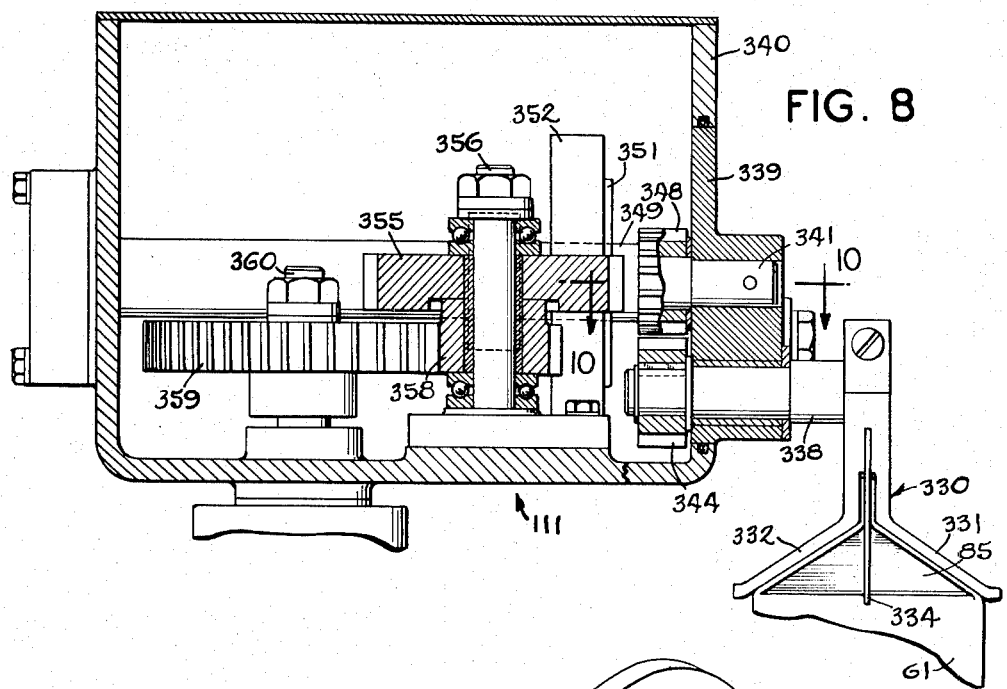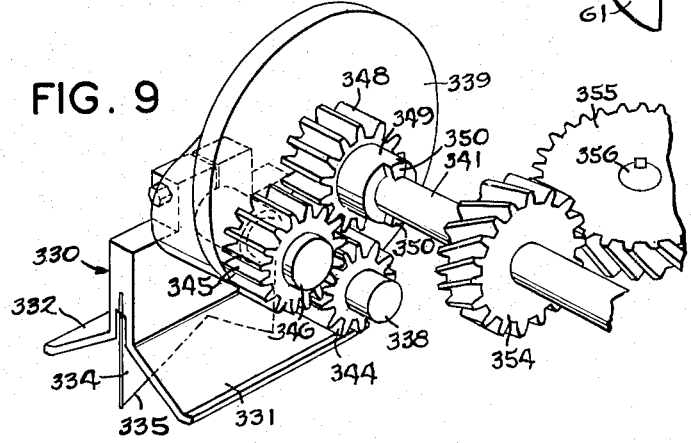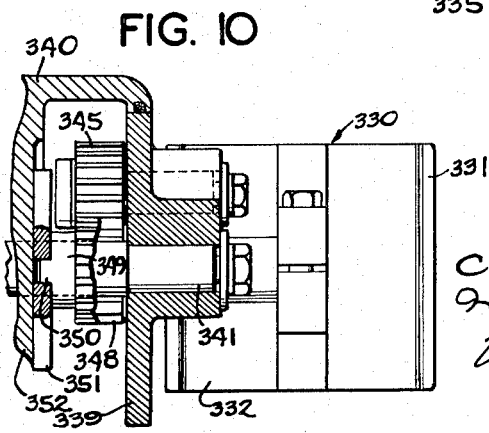

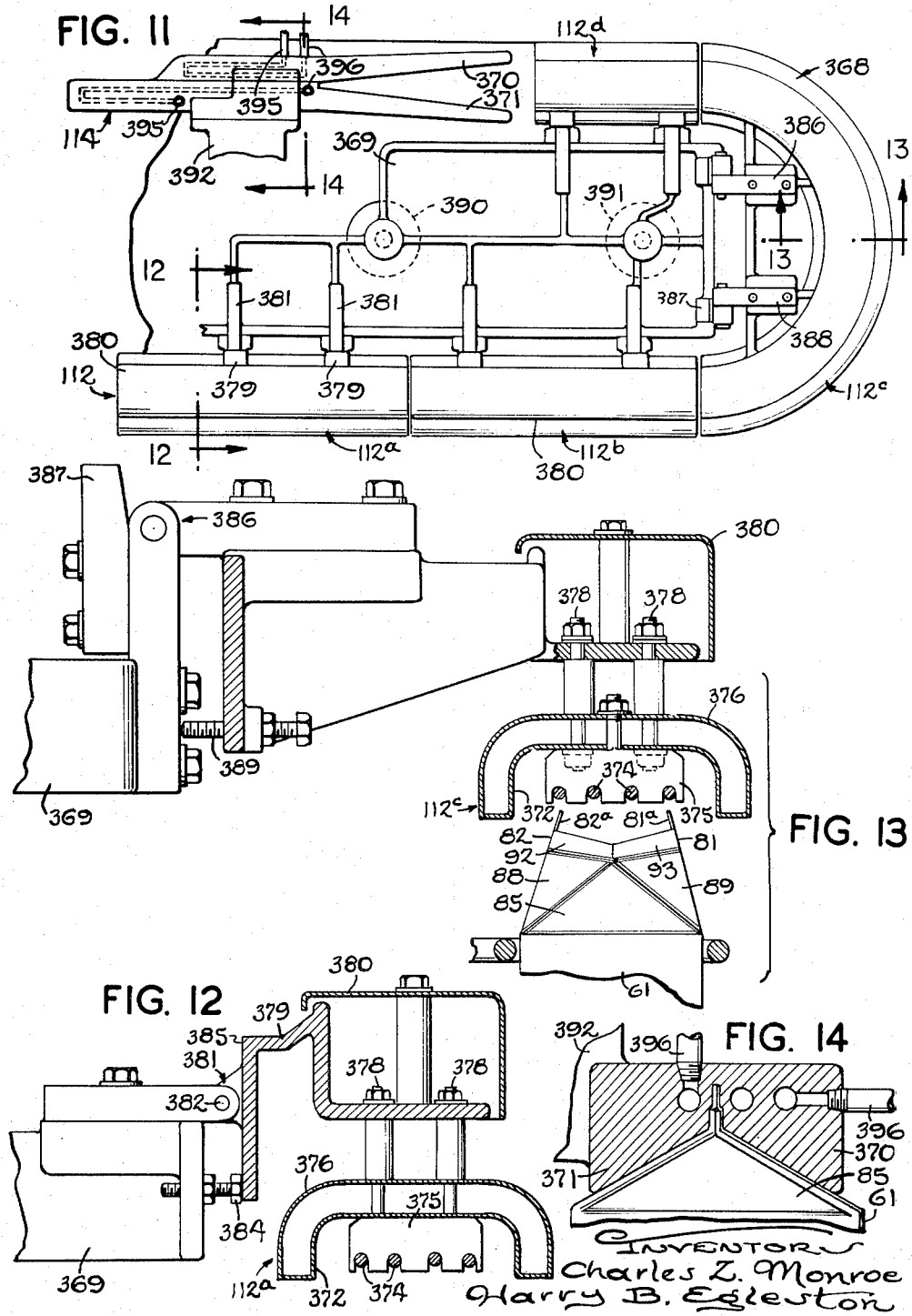

March 22, 1966 C. Z. MONROE, ETAL 3,241,291
MACHINE FOR FORMING, CLOSING AND SEALING PLASTIC
COATED PAPERBOARD CONTAINERS
Original Filed Nov. 7, 1960 8 Sheets-Sheet 8

INVENTORS
Charles Z. Monroe
Harry B. Egleston
Wolfe, Hubbard, Voit & Osann
ATTORNEYS

United States Patent Office 3,241,291
Patented Mar. 22, 1966

3,241,291
MACHINE FOR FORMING, CLOSING AND SEALING PLASTIC COATED PAPERBOARD CONTAINERS
Charles Z. Monroe, Detroit, and Harry B. Egleston, Livonia, Mich., assignors to Ex-Cell-O Corporation, Detroit, Mich., a corporation of Michigan
Original application Nov. 7, 1960, Ser. No. 67,482, now Patent No. 3,120,089, dated Feb. 4, 1964. Divided and this application July 3, 1963, Ser. No. 303,700
7 Claims. (Cl. 53—379)

This application is a division of our copending application, Serial No. 67,482, filed November 7, 1960, now Patent No. 3,120,089, issued February 4, 1964.

The present invention relates to carton forming machinery and, more specifically, to a novel machine for forming, closing and sealing plastic coated gable top containers of paperboard or the like. The machine finds particular, but not exclusive, utility in producing filled and sealed cartons from flat collapsed blanks of paperboard or the like having a thermoplastic moistureproof coating on their inner and outer surfaces.

One illustrative form of carton adapted to be processed by the machine disclosed and claimed herein is shown in Egleston et al. copending application Serial No. 122,571, filed in the United States Patent Office on July 7, 1961. More detailed information on such carton may, of course, be had upon direct reference to such application. For present purposes, however, it will suffice to note that the container or carton disclosed therein is made of high grade paperboard stock coated on both sides with a thermoplastic material such as polyethylene. The polyethylene coating on the paperboard is utilized not only as a moistureproofing material but also serves as a heat and pressure sensitive adhesive which cooperates in sealing the closure elements of the container so as to make a fluidtight package. Because sealing involves the application of considerable heat and pressure, suitable precautions must be taken to avoid damaging the polyethylene coating as the cartons are erected and sealed. Major reasons for this are the relatively low melting point of polyethylene and its tendency to stick to heated surfaces.

One object of the present invention is to provide high speed, automatic, precision machinery for forming carton blanks successively into erected and filled cartons having tightly sealed top and bottom closures by utilizing the thermoplastic coating as an adhesive.

Another object of the invention is to provide a machine of the character set forth and which will be adapted to fuse and seal the upper coated closure elements of the carton without damaging the moistureproof integrity of the thermoplastic coating thereon.

Still another object of the invention is to provide a machine of the foregoing type and which will effectively maintain the sanitary integrity of the cartons from the time that they are filled until they emerge from the machine fully sealed.

Other objects and advantages will become apparent in the light of the following detailed description, taken together with the accompanying drawings, wherein:

FIGURE 1 is a perspective view of an illustrative carton forming machine embodying the present invention.

FIGURE 1a is a plan view of a flat collapsed carton blank in the form in which it is presented to the machine of FIG. 1 for processing.

FIGURE 2 is a perspective view of an erected, filled and sealed carton in the condition in which it is discharged from the machine of FIG. 1 upon completion of its processing.

FIGURE 3 is a bottom view of the carton of FIG. 2.

FIGURES 4a and 4b are companion diagrammatic views which together present a plan view of the main drive system of the machine.

FIGURES 8, 9 and 10 are fragmentary vertical sectional, perspective, and horizontal sectional views, respectively, detailing the rotary steepler mechanism of the machine.

FIGURE 11 is a fragmentary plan view showing the top heating and closing mechanism of the machine.

FIGURES 12, 13 and 14 are enlarged fragmentary transverse sectional views through the mechanism of FIG. 11 and taken, respectively, in the planes of the lines 12—12, 13—13, and 14—14.

Figure 15:
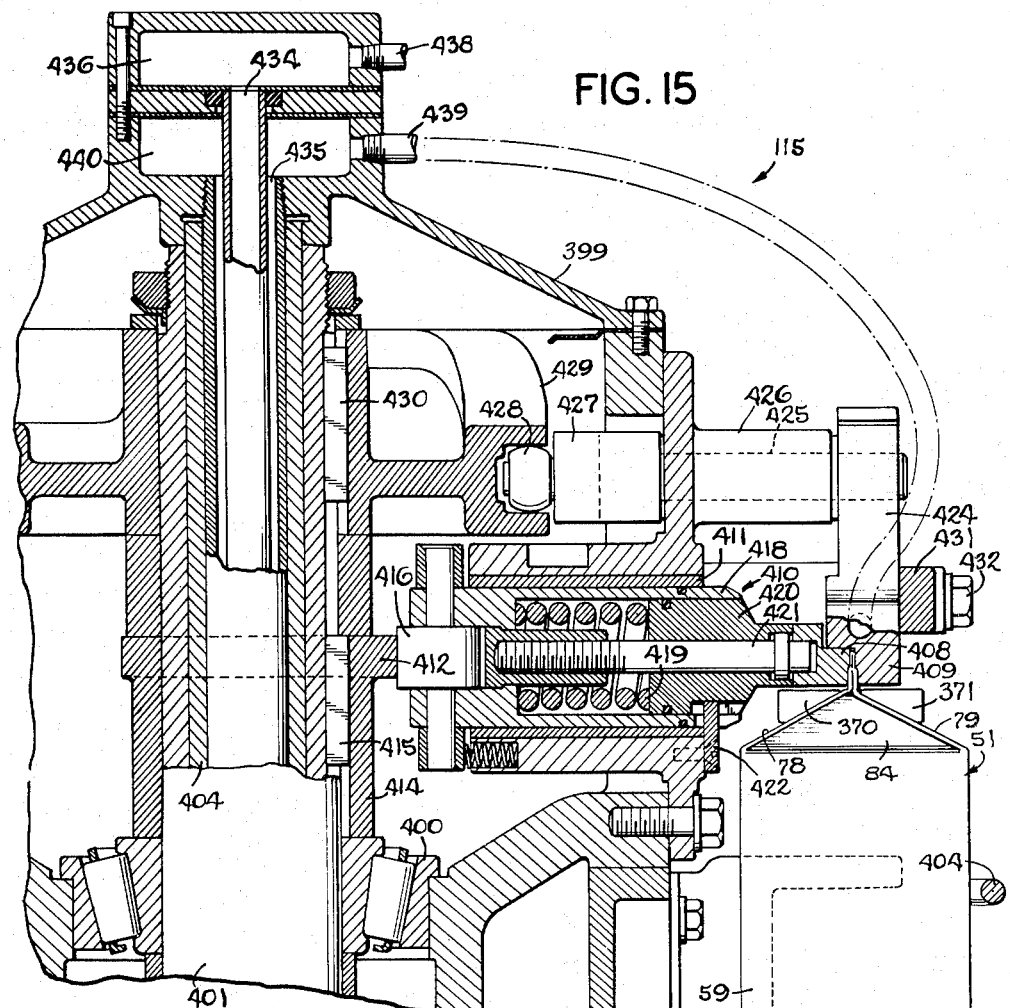

FIGURE 15 is an enlarged fragmentary vertical sectional view through the rotary sealer turret of the machine.

Figure 16:
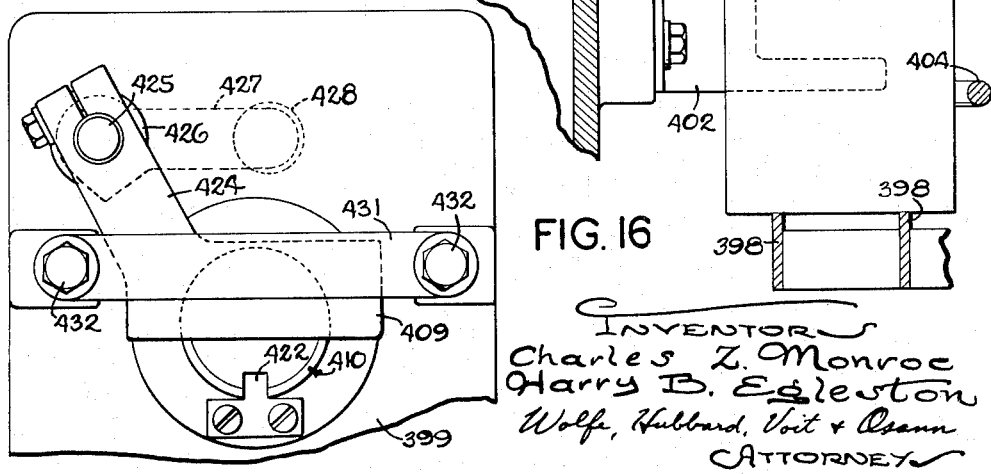

FIGURE 16 is an enlarged fragmentary front elevation of one of the sets of sealing elements on the turret of FIG. 15.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, the invention is there exemplified in an illustrative machine 50 adapted to receive a supply of flat collapsed blanks 51 such as shown in FIG. 1a, process them automatically at high speed, and to discharge them in the form of filled and sealed cartons 52 such as the one illustrated in FIG. 2. Before presenting a detailed description of the machine 50, however, it would be desirable to outline briefly the salient features of the carton blank 51 and the carton 52 processed by the machine 50.

As shown more particularly in FIGS. 1a, 2, 3, 6 and 7, it will be noted that the carton 52 comprises a tubular body 54 of generally rectangular cross section having a bottom closure 55 and a top closure 56. Both the top and bottom closures are formed from integral extensions of the carton body and are held and sealed together in a manner which takes full advantage of the properties of the thermoplastic coating on the carton material.

The carton 52 is fashioned from a flat blank of paperboard or the like coated on both sides with thermoplastic material such as polyethylene, as pointed out earlier herein. The blank is divided by means of an appropriate pattern of score lines into a plurality of panels and areas which are utilized for the walls and the closure parts of the carton. Upon reference to FIG. 6, which illustrates the inner face of the blank, it will be noted that the body portion of the carton is defined by four side panels 58, 59, 60, 61 and a side seam flap 62 which is adhesively secured to the inner face of the side panel 58.

The bottom closure 55 is defined in part by a pair of major bottom panels 64, 65 which are integral extensions of alternate side panels 58, 60, and in part by a plurality of minor triangular panels 66, 67, 68 and 69, 70, 71 which are integral extensions of alternate side panels 59, 61. All of the bottom closure panels are integral parts of the blank and adjacent ones are separated from each other only by score lines which ultimately define the various folds or creases required to complete formation of the bottom closure. When the bottom closure is formed, the triangular panels 66, 69 fold inwardly toward one another and the respective pairs of smaller triangular panels associated with them fold back against the inner faces of the major bottom panels 64, 65. The projecting lateral edges 72 of the panel 64 are chamfered slightly, defining in the projecting portion of the panel 64 a tuck-in flap 64a which is inserted between the inner face of the major bottom panel 65 and the triangular foldback panels 68, 70 which tend to fold back toward the inner face of the panel 65. The bottom closure parts, when fully infolded, are pressed flat and heat sealed in this position, as illustrated in FIG. 3. Any potential leakage channels between folds, or exposed raw edges of the blank, are sealed as by means of linear shaped embossments 74, 75, and by transversely disposed embossments 76 in the shape of relatively short rectangular notches (FIG. 3).

The top closure 56 (FIG. 2) has substantially a gable top configuration comprising a pair of inclined roof panels 78, 79 surmounted by an upstanding top rib 80, defined in part by rib panels 81, 82. Interposed between the roof panels are triangular end panels 84, 85 each connected respectively to a pair of triangular foldback panels 86, 87 and 88, 89. Each pair of foldback panels is also connected to a corresponding pair of inner rib panels 90, 91 and 92, 93.

The top closure of the carbon 52 also includes an extensible pouring spout which, in this instance, happens to be defined by triangular end panel 84, foldback panels 86, 87 and inner rib panels 90, 91. Initially, the spout is disposed in collapsed condition within the top closure and protectively sealed by means of sealing panels 81a, 82a which are abuttingly secured together along the entire length of the top rib. To facilitate easy opening of the carton 52 and accessibility of the pouring spout, the pouring edges of the latter, together with the major areas of the inner rib panels 90, 91, may be covered with a patch or lip 94 of adhesive material. By this is meant material which will not bond to itself or to the thermoplastic coating on the surfaces of the blank during heat sealing of the top closure. Consequently, upon application of upward and outward thumb pressure to the infolded triangular panels 86, 87 under the inclined roof panels 78, 79, the bond between sealing panels 81a, 82a and the outer ends of the inner rib panels 90, 91 becomes torn or fractured, rendering the spout accessible and permitting the same to be sprung into its outwardly extended position ready for pouring.

General machine organization

Figure 5:
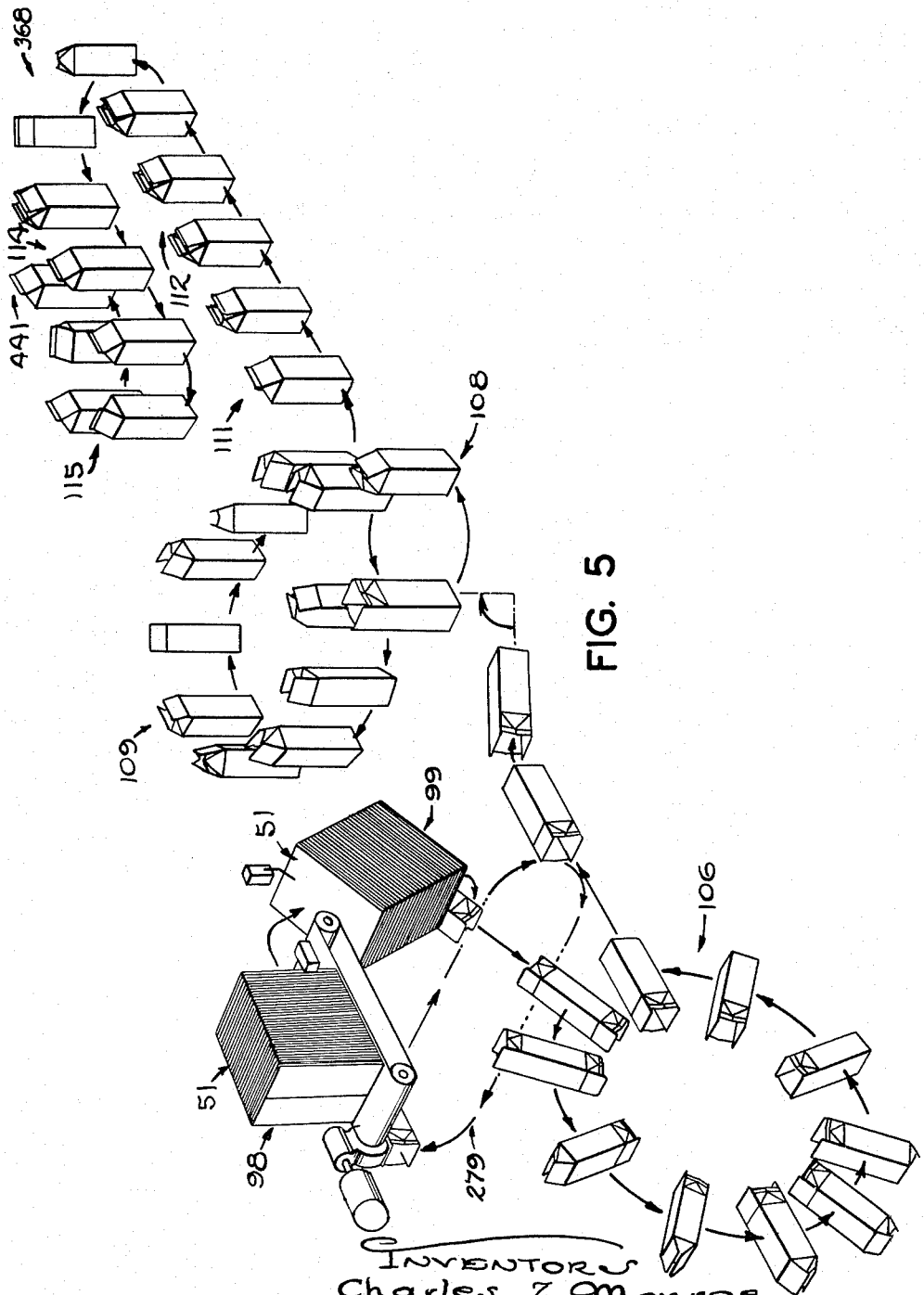
FIGURE 5 is a diagrammatic perspective view illustrating the carton path and sequential positions of the carton as it passes through the machine incident to being processed therein.
Figure 6:
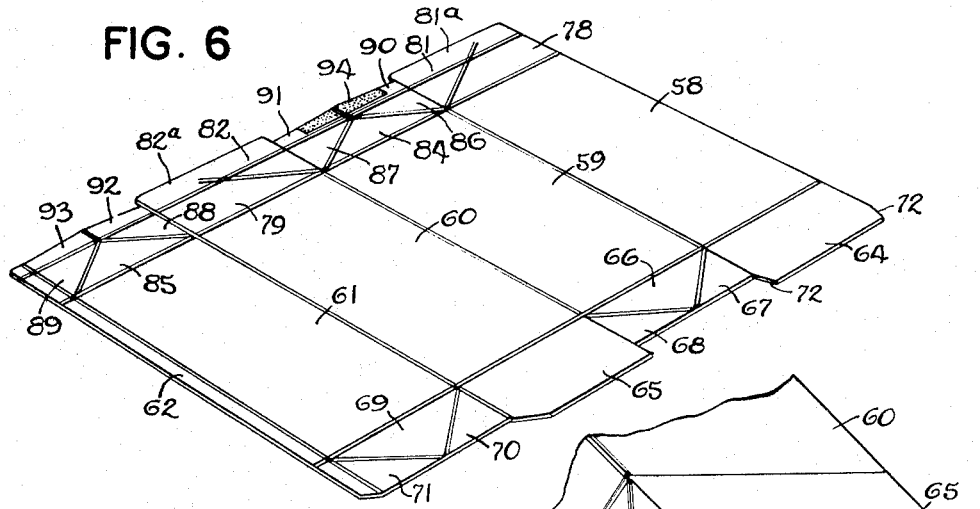
FIGURE 6 is an enlarged perspective view showing the inside face of the blank of FIG. 1a, the blank being opened out flat for purposes of better illustration.
Figure 7:
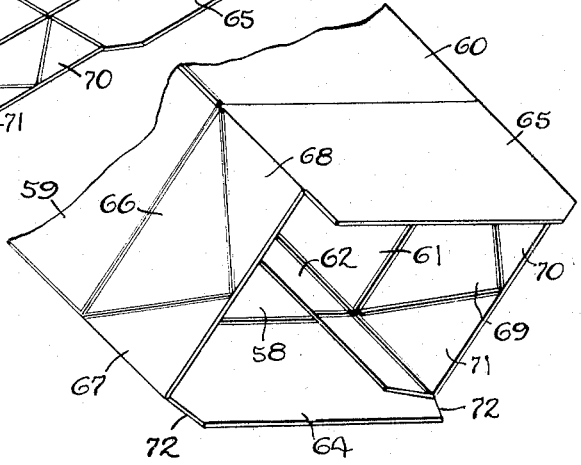
FIGURE 7 is an enlarged fragmentary perspective view showing the bottom closure elements of the blank and carton of FIGS. 1a, 2, 3 and 6.

Referring more particularly to FIGS. 1 and 5, the illustrative machine 50 is adapted to receive a supply of flat folded tubular blanks 51 such as the one illustrated in FIG. 1a and described earlier herein. The blanks are stacked, top down, in a magazine from which they are successively withdrawn by means of a feeder, erected into open-ended tubular form and loaded onto a multi-station bottom forming mechanism which forms and heat seals the bottom closure. Following the formation of the bottom closure, the blanks are successively transferred to a rotary top breaker mechanism and thence to a rotary filler mechanism. After filling, the blanks, which are partially completed cartons open at the top, are presented to a rotary steepler mechanism, resulting in further breaking or flexing of the top closure elements about their score lines. The filled, open cartons are then conveyed beneath stationary top heater and closer units which activate the thermoplastic on the top closure elements and bring them together without applying any substantial pressure. The closed cartons are then presented to a rotary sealer unit which applies sealing pressure to the top closure elements. Following this, the filled and sealed cartons pass through a pair of dater rolls and are discharged in a continuous procession from the machine. For convenience, the partially completed cartons will be designated by the reference numeral 51 at their various stages of completion in the machine, and by the numeral 52 upon emergence from the machine as a finished product.

The machine 50 comprises a console 95 supported on legs 96 and supplied with utilities such as electric power, compressed air, and cooling water from appropriate external sources. A magazine loader 98 and magazine 99 are mounted on top of the console at one end of the machine. Operatively associated with the magazine and adjacent to it are a feeder mechanism 100 and a loader mechanism 101. On the side of the console below these mechanisms is the operator's control panel 102 for the machine and an emergency stop bar 104. To the left of the control panel 102 (as viewed in FIG. 1) and beneath the magazine loader 98, is the operator's indicator panel 105. The latter reflects satisfactory or unsatisfactory performances of the various units throughout the machine so that trouble spots can be quickly pinpointed and corrected.

Bottom forming mechanism 106 is situated roughly between the indicator panel 105 and the loader 101, being housed within an appropriate protective enclosure. The mechanism 106 is adapted to receive blanks successively from the loader 101, top down, and to move them from station to station in an orbital path to form their bottom closure. The blanks are then ejected and presented to a transfer receptacle which shifts them from a horizontal to a vertical position and presents them to a rotary top breaker unit 108 on top of the console. From this point on, the cartons remain above the top of the console.

The rotary top breaker unit 108, which happens to rotate counterclockwise when viewed from the top, presents the open top carton to rotary filler unit 109. The latter, which rotates clockwise when viewed from the top, fills the cartons successively and presents them to a main conveyor 110. The main conveyor thereupon moves the filled cartons, still open at the top, under a rotary steepler mechanism 111, and thence under stationary top heater and closer units 112, 114. From here, the filled and closed cartons are transferred to a rotary top sealer unit 115. After final sealing on the latter, the filled and completed cartons are passed through dater rolls and discharged from the machine.

The magazine, loader and bottom forming mechanisms are discussed in detail in our copending divisional applications and are, therefore, discussed herein only generally in order to provide a complete picture of the machine as a whole.

Rotary steepler mechanism

After the carton has been filled, its top closure panels, even though prebroken, tend to return toward their fully open position. This may be due to a variety of reasons, including the outward pressure on the carton walls resulting from filling and also to the nature of the particular thermoplastic coating on the carton. For example, polyethylene tends to return gradually to its original position even after substantial deformation and this quality is to some extent reflected in a carton where it is used as a coating on the paperboard. Another factor is that in the present instance, rotary top breaker acts directly on the infolded triangular panels 84, 85 of the blank but only indirectly on the inclined roof panels 78, 79.

In view of the foregoing, and in order to obtain adequate application of heat for top closing and sealing, steepler mechanism 111 (FIGS. 1, 5, 8, 9 and 10) is mounted along the carton path between the filler unit 109 and the top heater unit 112. The unit 111 includes a steepler member 330 adapted to engage the top closure panels of each carton as the latter is carried thereunder by main conveyor 110.

The steepler member 330 comprises a pair of downwardly inclined folder plates 331, 332 giving it a generally inverted Y-shaped cross section along the path of carton travel. Mounted in depending relation between the plates 331, 332 and vertically disposed is another folder plate 334 having a lower edge 335 of shallow inverted V-shaped contour. With this arrangement, it will be appreciated that as the member 330 is brought down against the top of the carton 51 (FIG. 8) the folder plates 331, 332 will cam inwardly respective ones of the major top panels 78, 79 and their associated top rib panels 81, 81a, 82, 82a. At the same time, the lower edge of central folder plate 334 applies an inward camming action on the upper edges of the inner rib panels and, specifically, at the top end of the score lines between the rib panels 92, 93 and 90, 91. Such action also results in substantial inward folding of the triangular end panels 84, 85. The folding action is sufficiently rigorous so that the top closure panels are left in partially infolded condition as the carton is presented to the top heater 112.

Provision is made for driving the steepler member 330 in an orbital path aligned with and overlying the path of the carton on the main conveyor 110. During the lower pass of such orbital movement, the member 330 drops down into engagement with the carton top without interrupting the continuous movement of the carton on the conveyor. Conversely, on the upper pass of its orbital movement, the member 330 returns to initial position from which the cycle is repeated for the next succeeding carton.

In this instance, the member 330 is fixed to a mounting shaft 338 journaled eccentrically in a carrier 339 mounted in the front wall of steepler housing 340 (FIGS. 8, 9 and 10). The carrier 339 is rotated by means of a drive shaft 341 journaled in any appropriate manner within the housing 340 and fixed to the carrier as by means of pin 342. The end of the shaft 338 remote from the member 330 has keyed thereon a planetary gear 344. The latter meshes with an idler gear 345 having the same number of teeth and freely journaled on a stub shaft 346 fastened to the carrier. The idler gear 345 meshes with a fixed sun gear 348 also having the same number of teeth and which is journaled on the shaft 341. The sun gear 348 is precluded from rotation as by means of an integral sleeve 349 having lugs 350 which lock with corresponding slots in a fixed collar 351 on interior bearing web 352 of the housing.

With this arrangement, it will be noted that rotation of the steepler drive shaft 341 will rotate the carrier 339 causing it to move the steepler member 330 orbitally about the axis of shaft 341. Due to the identity of the numbers of teeth of the gears 344, 345, 348 and to their planetary action, the steepler member 330, together with its shaft and gear 338, 344, maintain the same attitude throughout their orbital movement. Consequently, the steepler member moves parallel to itself throughout the upper and lower passes of its orbital travel.

For the purpose of driving the shaft 341 in synchronism with the main machine drive, a spiral gear 354 is fixed on the shaft 341 in meshing engagement with a horizontally disposed spiral gear 355. The latter is fixed via a common shaft 356 to a smaller diameter spur gear 358. The gear 358, in turn, drivingly meshes with a relatively large spur gear 359 keyed or otherwise secured to an upstanding extension of main conveyor drive shaft 360. In this instance, the shaft 300 is driven as by means of a chain and sprocket connection 361 and spiral gears 362, 364, the latter being fixed on an extension 365 coupled to the main drive shaft 166 (FIG. 4b).

*Top heater and closer assembly*

As noted earlier herein, the top heater and closer assembly 368 (FIGS. 1, 11, 12, 13 and 14) is adapted to prepare the top closure panels of the filled carton 51 for heat sealing and to close the top of the carton, bringing into adhesive contact the panels which have been adhesively activated. Such contact is made, however, without application of any substantial presure. The heater and closer assembly is mounted on top of the machine console to the right of the top breaker and filler units 108, 109, as viewed in FIG. 1, and includes means for moving the carton continuously in a relatively long U-shaped path extending longitudinally of the console. The assembly 368 comprises main conveyor 110, a central support plate 369, a plurality of heaters 112a, 112b, 112c and 112d, and top closing unit 114 defined by fixed closing jaws 370, 371.

The top heaters 112a, 112b, 112c and 112d are mounted in cantilever fashion on the support plate 369 and extend into overlying relation with, and conform to the shape of, the path of the carton as it moves on main conveyor 110 (FIGS. 1 and 11). Referring more specifically to FIG. 12, the heater 112a is there illustrated in transverse section and is typical of the other straight heaters in the assembly 368. The heater 112a comprises an inverted trough reflector 372 which in this instance carries a plurality of electric resistance heating elements 374 situated therein on spacers 375 of porcelain or other appropriate material. The elements 374 are spaced with respect to each other and with the reflector 372 so as to drive into top closure panels 81a, 82a, 90, 91, 92 and 93 sufficient heat to cause adhesive activation of their thermoplastic coating. As noted earlier herein, in the case of cartons having polyethylene for such coating, these panels must be heated to approximately 350° to 500° Fahrenheit to produce adequate adhesive activation for sealing. In order to provide as much protection as possible for the machine operator and also to conserve the amount of heat used, the reflector 372 is provided with a jacket 376 leaving an air space therebetween.

The reflector and its heating elements are secured as by bolts 378 in depending relation from one or more cantilever brackets 379. Electric power is supplied via appropriate flexible conduit (not shown) to terminals (not shown) at the outer ends of the brackets 379 connected to the heating elements 374. Such terminals are suitably protected by a cover 380.

To permit access to the cartons on the conveyor 110 and also facilitate maintenance of the heaters, the cantilever brackets are connected to the support plate 369 by hinges 381 which swing on pins 382. The heater 112a may be swung from its horizontal or operating position, illustrated in FIG. 12, where it rests on an adjustable stop 384, to an upstanding or inoperative position where it is tilted back slightly over the support plate and rests against a fixed stop abutment 385.

The heater 112c (FIGS. 11, 13), while generally similar to the straight heater just described, is substantially semicircular in shape and mounted to overlie the curved portion of the carton path. The heater 112c is connected to the support plate by means of hinges 386, 388 and rests on adjustable stop 389. The heater 112c is adapted to be shifted pivotally on such hinges between an operative position illustrated in FIGS. 11 and 13 and a raised or inoperative position where it is simply tilted back toward the support plate until its hinges reach their limit of movement as defined by one or more stops 387.

With electrical resistance elements of the type described, the temperature at the element may be on the order of 1400° to 1600° F. With a procession of cartons in motion onder these elements, this is sufficient to raise the temperature of their top closure panels satisfactorily to the 350° to 500° required for sealing. If, however a machine stoppage should occur, the top closure panels and thermoplastic coated cartons in the conveyor 110 under the heaters may suffer severe thermal damage.

Provision is made for obviating this danger by a mechanism which raises the heaters to a safe distance above the cartons automatically and as an incident to the stoppage of the machine. In this instance such is accomplished as by means of pneumatic actuators 390, 391, mounted on the machine console 95 and having their plungers connected to the support plate 369. Upon stoppage of the machine, air pressure is automatically admitted to the actuators 390, 391 and the support plate 369, together with the heaters carried thereon, is immediately elevated to a safe position above the cartons. In addition to protecting the cartons, this arrangement also renders them accessible to the operator if it should become necessary to clear a jam on the conveyor.

Turning now to the top closer unit 114 per se, it will be noted upon reference to FIGS. 11 and 14 that the latter is mounted on a supporting column 392 on top of the console with its fixed jaws 370, 371 disposed in longitudinally aligned, overlying relation with the carton path. The jaws 370, 371 have tapered extensions at their leading ends (FIG. 14) which straddle the top of the carton 51 as it emerges from the last heater 112d. The jaws converge in the direction of movement of the carton on the conveyor 110, camming against the roof panels and top rib panels and ultimately bringing them together in a closing tunnel 394 of inverted Y-shape (FIG. 14). The tunnel 394 is proportioned so as to afford a relatively close sliding fit with the top closure members of the carton as it passes thereunder.

In order to preclude sticking and possible build-up of thermoplastic coating on the closing jaws 370, 371, they may be supplied with fluid coolant via suitable internal passages and inlet and outlet connections 395, 396 (FIGS. 11, 14).

*Rotary top sealer unit*

The rotary top sealer unit 115 (FIGS. 1, 15, 16) is mounted on top of the machine console and situated substantially tangentially to the path of the carton as it emerges from the tunnel of the closer unit. The closed carton 51 is thereupon transferred from its associated receptacle of main conveyor 110 and onto fixed arcuate skids 398 concentric with the unit.

The top sealer unit 115 comprises a turret 399 journaled as by means of antifriction bearings 400 on a hollow, stationary shaft 401 anchored on the frame of the machine as by means of an adjustable timing sleeve 404 (FIG. 15). The turret 399 includes a plurality of moving carton sealing stations, in this instance four in number, adapted to apply sealing pressure to the carton top rib for the required time interval without interrupting the continuous movement of the carton through the machine. Each sealing station includes a carton pusher bracket 402 which is adapted to slide the carton along the support rails 398. Surrounding arcuate guide rails 402 prevent the carton from straying out of its proper path.

The turret 399 is driven in timed relation to the main drive of the machine as by means of a gear 405 integrally connected to the turret and located above the top of the machine console (FIGS. 4b and 15). The gear 405 is driven from pinion 406, the latter being fixed to spiral gear 362 which meshes with spiral gear 364 on main drive shaft extension 365.

For the purpose of applying sealing pressure to the carton top rib panels as an incident to rotation of the sealer turret 399, each carton station of the latter is equipped with a pair of movable pressure jaws 408 and 409 (FIGS. 15, 16). The jaw 408, which is adapted to contact the surface of the top rib facing the turret, is fixed to the projecting end of a radially disposed plunger 410. The latter is shifted on a radial axis defined by bearing sleeve 411 in timed relation with the rotation of the turret by reason of a fixed cam 412 having a sleeve 414 keyed as at 415 to stationary shaft 401. The cam 401 actuates a follower roller 416 carried by sleeve 418, which is actually a part of the plunger 410, to apply outward sealing pressure to the jaw 408.

In order to accommodate variations in carton top rib thickness which may occur from time to time, a moderate amount of resiliency may be introduced into either or both sealer jaws. In the present instance, only the jaw 408 is resiliently mounted. This is accomplished by means of a compression spring 419 interposed between the plunger sleeve 418 and head 420 of jaw 408. The compression of the spring 419, and the extent of the relative movement between the members 418, 420, may be determined by adjustable stop bolt 421 (FIG. 15). Members 418, 420 are retained radially and circumferentially in their bearing sleeve by means of key 422 secured to the turret housing.

Provision is made for applying a firm axial thrust against the exterior of the carton top closure following presentation of the closed carton to the top sealer so that the adhesively activated top closure panels will be maintained in proper position relative to one another as sealing pressure is applied. This is accomplished in the present case by forming the jaw 409 with a pressure face for engaging the outward face of the top rib, and a second pressure face substantially perpendicular to the first one for engaging the upper edge of the top rib before sealing pressure is applied by the jaws. In furtherance of such objective, the jaw 409 is mounted on an integral crank arm 424 adjustably fixed to the rock shaft 425 journaled in a hub 426 on the turret housing (FIGS. 15, 16). The inner end of the rock shaft 425 has a crank 427 thereon carrying a follower roller 428 at its outer end which runs in the track of a fixed cam 429. The latter is also keyed, as at 430, to the upstanding stationary shaft 401.

By reason of such arrangement, it will be perceived that the jaw 409 is adapted to be cammed down into engagement with the upper edge of the top rib and into cooperative registration with the complemental jaw 408, the latter action being facilitated as the second pressure face of the jaw 409 abuts solidly against the top of jaw 408. The jaw 408 is adapted to be cammed radially outward a short time later and to squeeze the carton top rib against the jaw 409 for sealing. The jaw 409 is backed up so as to withstand such pressure and in the present instance this is accomplished by means of a backup bar 431 rigidly fixed to the turret housing as by means of cap screws 432. The latter retain the bar 431 in longitudinal abutment with the outer face of the swinging jaw 409 when the latter is in sealing position.

Because the mass of the swinging jaw 409 is relatively smaller than that of the jaw 408 and its plunger 410, the jaw 409 may be fluid cooled. Coolant may conveniently be introduced via a central supply line 434 running longitudinally of the stationary support shaft 401 and withdrawn via a discharge conduit 435 also housed in the support shaft in spaced surrounding relation with the supply conduit. The turret 399 has a coolant supply chamber at the top 436 fed by line 434 and connected via a flexible line 438 to one of the swinging jaws 409, thence in series through the remaining jaws 409 and back via flexible return line 439 to a discharge chamber 440 also at the top of the turret. The latter communicates with discharge line 435.

Once sealed, the filled cartons may be dated and presented for distribution as described in Patent No. 3,120,089, mentioned earlier herein.

We claim as our invention:

1. In a carton forming machine for thermoplastic coated blanks of paperboard or the like having gable top closure panels defined therein, a steepler unit comprising, in combination, a steepler member, a pair of opposed downwardly inclined folder plates on said steepler member, a central plate on said steepler member between said folder plates and having a lower edge of inverted V-shaped contour, and means for driving said steepler member in an orbital path for engaging a carton top while the same is in motion.

2. In a carton forming machine for thermoplastic coated blanks of paperboard or the like having gable top closure panels defined therein, a steepler unit comprising, in combination, a steepler member having a pair of opposed inclined folder plates adapted for engagement with at least one opposed pair of gable top closure panels, a movable carrier, a shaft journaled eccentrically in said carrier and having said steepler member secured to one end thereof, a planetary gear secured to the opposite end of said shaft, a sun gear mounted coaxially with said carrier but secured against rotation therewith, a second planetary gear freely journaled on said carrier and disposed in meshing engagement with said first planetary gear and said sun gear, all said gears having equal numbers of teeth whereby said steepler member is caused to move parallel to itself but in an orbital path described by the movement of said carrier.

3. In a machine for forming cartons from thermoplastic coated blanks having heat sealable gable top closure panels defined therein, the combination comprising a carton conveyor, a support member adjacent said conveyor, a plurality of heaters having inverted trough reflectors overlying said conveyor and disposed along a part of the path thereof, radiant heating elements mounted on said reflectors, a pair of fixed jaws disposed along another part of the path of said conveyor in straddling relation with the gable top closure panels of the cartons moving therewith, said jaws converging toward one another in the direction of carton movement and upon convergence defining a fixed closing tunnel of inverted Y-shape for closing the carton, means defining fluid coolant passages in said closer jaws straddling said closing tunnel, and connection means for supplying fluid coolant to said passages to preclude adhesion of the thermoplastic coating of said blanks.

4. In a machine for forming cartons from thermoplastic coated blanks having heat sealable top closure panels defined therein, a top sealer unit comprising, in combination, a rotary turret, a radially movable plunger in said turret, a first sealer jaw connected to said plunger, a rock shaft mounted on said turret, a second sealer jaw fixed to said rock shaft and adapted to register with said first jaw, and fixed cams housed within said turret for bringing said jaws together in timed relation with each other.

5. In a machine for forming cartons from thermoplastic coated blanks having heat sealable top closure panels defined therein, a top sealer unit comprising, in combination, a rotary turret, a radially movable plunger in said turret, a first sealer jaw connected to said plunger, a rock shaft mounted on said turret, a second sealer jaw fixed to said rock shaft and adapted to register with said first jaw, fixed cams housed within said turret for bringing said jaws together in timed relation with each other, and a backing bar secured to said turret on the side of said second sealer jaw remote from said first sealer jaw, said backing bar and said second sealer jaw having abutting surfaces slidable relative to each other.

6. In a machine for forming cartons from thermoplastic coated blanks having heat sealable top closure panels defined therein, a top sealer unit comprising, in combination, a rotary turret, a movable plunger on said turret, a first sealer jaw connected to said plunger, a rock shaft mounted on said turret, a second sealer jaw fixed to said rock shaft and adapted to register with said first jaw, at least one of said jaws being resiliently loaded relative to the other, fixed cams housed within said turret and adapted to bring said jaws together on a carton top in timed relation with each other.

7. In a machine for forming cartons from thermoplastic coated blanks having heat sealable top closure panels defined therein, a top sealer unit comprising the combination of a rotary turret, a first sealer jaw mounted on said turret, said first sealer jaw having a pressure face adapted to bear against one side of a carton top, a second sealer jaw mounted on said turret and adapted to register with said first jaw, said second sealer jaw having one pressure face adapted to bear against the other side of said carton top and another pressure face adapted to bear against the upper edge of said carton top, fixed cams housed within said turret for bringing said jaws together in timed relation with each other, and means for cooling said second sealer jaw.

References Cited by the Examiner
UNITED STATES PATENTS

| | | | |
|---|---|---|---|
| 2,420,763 | 5/1947 | Wells | 53—388 |
| 2,883,819 | 4/1959 | Jensen | 53—379 |
| 3,002,328 | 10/1961 | Monroe et al. | 53—375 |
| 3,010,267 | 11/1961 | Richardson et al. | 53—379 |
| 3,045,403 | 7/1962 | Mitchell | 53—182 |

TRAVIS S. McGEHEE, *Primary Examiner.*

FRANK E. BAILEY, *Examiner.*